United States Patent [19]
Dzuban

[11] Patent Number: 5,859,661
[45] Date of Patent: Jan. 12, 1999

[54] TECHNIQUE FOR REDUCING OVERLOAD IN A SHARED TRANSMISSION NETWORK

[75] Inventor: Mark L. Dzuban, Forked River, N.J.

[73] Assignee: AT&T Corp., Middletown, N.J.

[21] Appl. No.: 640,348

[22] Filed: Apr. 30, 1996

[51] Int. Cl.⁶ .............................. H04M 7/16; H04H 1/00
[52] U.S. Cl. .............................................. 348/12; 455/3.1
[58] Field of Search ................................... 348/12, 13, 7, 348/6; 455/5.1, 6.1, 6.2, 3.1, 4.2; 379/399

[56] References Cited

U.S. PATENT DOCUMENTS

| | | | |
|---|---|---|---|
| 3,223,920 | 12/1965 | Sasaki | 323/206 |
| 3,710,231 | 1/1973 | Baker | 323/290 |
| 3,924,187 | 12/1975 | Dormans | 455/4.1 |
| 4,440,985 | 4/1984 | Federico et al. | 379/5 |
| 4,982,440 | 1/1991 | Dufresne et al. | 455/4.1 |
| 5,126,840 | 6/1992 | Dufresne et al. | 348/6 |
| 5,317,392 | 5/1994 | Ishibashi et al. | 348/6 |
| 5,495,212 | 2/1996 | DeCramer | 333/25 |

*Primary Examiner*—Krista Zele
*Assistant Examiner*—Charles N. Appiah
*Attorney, Agent, or Firm*—Robert B. Levy

[57] ABSTRACT

A saturable core reactor (28) is interposed between a subscriber premises (12) and a node (18) in a shared network (10) for reducing the incidence of noise associated with signals passing between the subscriber premises and the node. When combined magnitude of the signals and any noise embodied therein exceeds a prescribed threshold, the saturable core reactor saturates, preventing excessive noise from passing in the network.

7 Claims, 2 Drawing Sheets

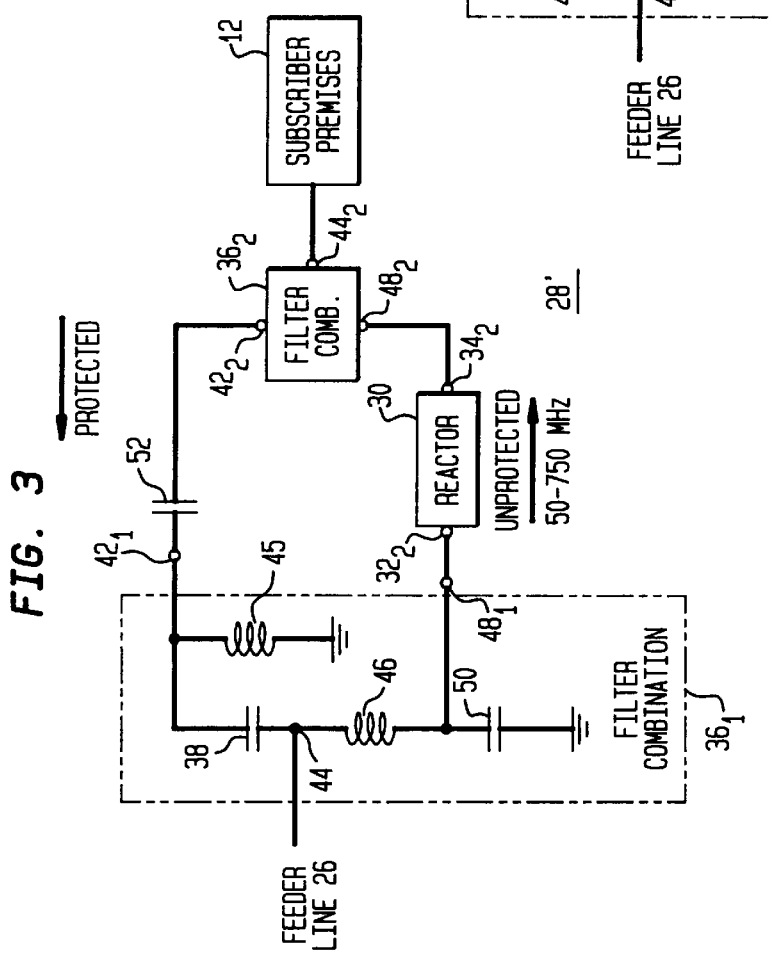

5,859,661

TECHNIQUE FOR REDUCING OVERLOAD IN A SHARED TRANSMISSION NETWORK

TECHNICAL FIELD

This invention relates to a technique for reducing the incidence of overload, due to noise and/or interference, passing between a subscriber premises and a node in a shared transmission network.

BACKGROUND ART

Traditional cable television systems provide one-way transmission of video information from an originating network node (usually referred to as a "head end") to a subscriber premises via a network of coaxial cables, or a mixture of optical fiber cables and coaxial cables. In the later case, the optical fiber cables each carry the video information from the head end to at least one separate network node (often referred to as a fiber node) that serves a set of subscribers in a selected geographic region. At each fiber node, the video information is converted from an optical format into one or more electrical signals that are split for distribution via coaxial cables to individual subscriber premises.

In addition to conventional one-way networks, there now exist two-way or shared networks. In a shared network, video information is delivered to the individual subscriber premises in the manner described above. The same transmission system that carries video information to each subscriber premises also carries information, typically in the form of voice, video, data, etc. from each subscriber premises back to the head end. At the head end, the information generated at each subscriber premises may be transmitted via a Local Exchange Carrier (LEC), an Other Common Carrier (OCC) or an Inter-Exchange Carrier (IXC), or any combination thereof, to another subscriber premises served by a different shared network.

In practice, the information originating at each subscriber premises within such a shared network is combined with information originating at one or more other subscriber premises prior to reaching the head end. Different types of multiplexing techniques are employed to avoid any interference or commingling of the information. When the information is combined, the noise that may be present is also combined. Even though the actual amount of noise embodied within the information that originates at one subscriber premises may be small, the total amount of the combined noise may be significant. If the noise exceeds a certain threshold, the content of the information may be lost.

Another problem that is associated with both one-way and shared networks is electrical interference that may enter the network from the subscriber premises as a result of a malfunction of the subscriber's hardware. In some instances, the inference may result from a deliberate attempt by a subscriber to jam the network. In either event, such interference may often disrupt the signals transmitted and received by other subscribers.

Thus, there is a need for a technique that reduces the incidence of overload present in a shared network because of noise and/or interference.

BRIEF SUMMARY OF THE INVENTION

Briefly, in accordance with a preferred embodiment of the invention, a method is provided for reducing the incidence of overload in a shared network caused by excessive noise and/or interference passing from an individual subscriber premises to a node within the shared network. In accordance with the method, electrical signals embodying information intended for passage from the subscriber premises to the node are transmitted through a saturable core device. The saturable core device advantageously becomes saturated when the level of the of the electrical signals and/or noise transmitted through the reactor exceeds a prescribed level. In this way, excessive noise and/or interference from each subscriber premises is effectively blocked from reaching the node.

BRIEF DESCRIPTION OF THE DRAWINGS

FIG. 3 shows a second embodiment of a protection mechanism, in accordance with the invention, for reducing the incidence of overload within the network of FIG. 1 and FIG. 4 shows a third embodiment of a protection mechanism, in accordance with the invention, reducing the incidence of overload within the network of FIG. 1.

DETAILED DESCRIPTION

Figure 1:
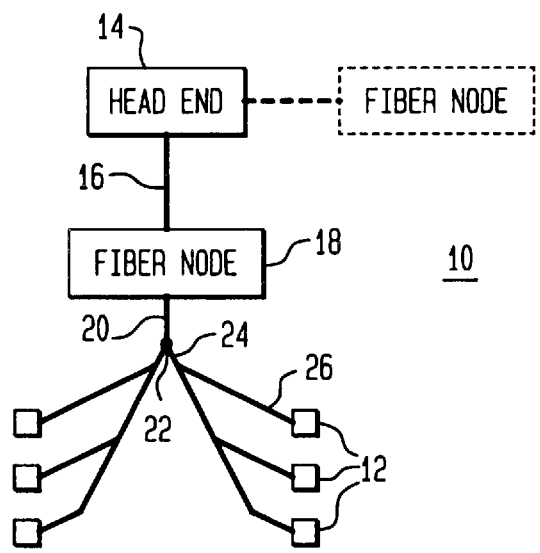
FIG. 1 is a block diagram of a shared network in accordance with the prior art.

FIG. 1 shows a prior-art shared network 10 of the type presently used for transmitting video information, having a bandwidth of between 50 to 750 MHz, to a plurality of subscriber premises 12—12 from a head end 14. In the shared network 10 of FIG. 1, the head end 14 has the capability to supply video information and to receive information generated at each subscriber premises 12. Such information may take the form of voice, video, data, etc. for routing within the network 10 to another subscriber premises 12. Alternatively, such information may be routed to a subscriber premises (not shown) that is served by a different shared network. To that end, the head end 14 may be coupled to a Local Exchange Carrier (LEC), Other Common Carrier and/or an Inter-Exchange Carrier (IXC) (not shown) to facilitate such information interchange.

Within the network 10 of FIG. 1, video information intended for transmission to a bank of subscribers in a particular geographic region is transmitted from the head end 14 in an optical format over at least one optical fiber 16 for receipt at a fiber node 18 at which the information is converted to one or more electrical signals. The electrical signals produced at the fiber node 18 are transmitted on at least one main coaxial trunk 20 to a splitter 22 that splits the signals into separate signal portions that are transmitted one or more main coaxial trunks 24—24. One or more amplifiers (not shown) may be disposed on each main trunk 20 or branch trunk 24 for amplifying the signals on that trunk. A coaxial feeder line 26 couples each subscriber premises each trunk 24.

As discussed, the network 10 has the capability of providing video information to each subscriber premises as well as to carry information, typically in the form of voice, video, data, etc. from each subscriber premises back to the head end 14. Thus, the optical fiber node 18, the fiber 16, as well as the coaxial cable trunks 20 and 24, can carry information in both directions. (In some instances, separate channels may be provided for carrying information in opposite directions.) Each splitter 22 has the capability of splitting the electrical signals output by the fiber node 18 and the capability of combining the electrical signals from different subscriber premises 12—12 representing the information (e.g., the voice, video, data, etc.) generated at each such premises.

When the electrical signals representing the information generated at the different subscriber premises 12—12 are combined, the noise present in such signals is likewise combined. Even though the noise embodied within the signals generated at an individual one of the subscriber premises 12—12 may be small, the combined noise may be large. Indeed, the level of the combined noise may be large to interfere with the information content of the signals. Thus, excessive noise is undesirable.

Another potential problem that can plague the shared network 10 is interference. For example, a hardware element, such as a set top box (not shown) at a subscriber premises 12 may malfunction and, in the process, emit signals and/or noise well above a maximum tolerance level, thereby jamming the network. Occasionally, a subscriber may try to purposely jam the shared network by deliberately applying signals having a high magnitude, thereby disrupting service to others.

Figure 2:
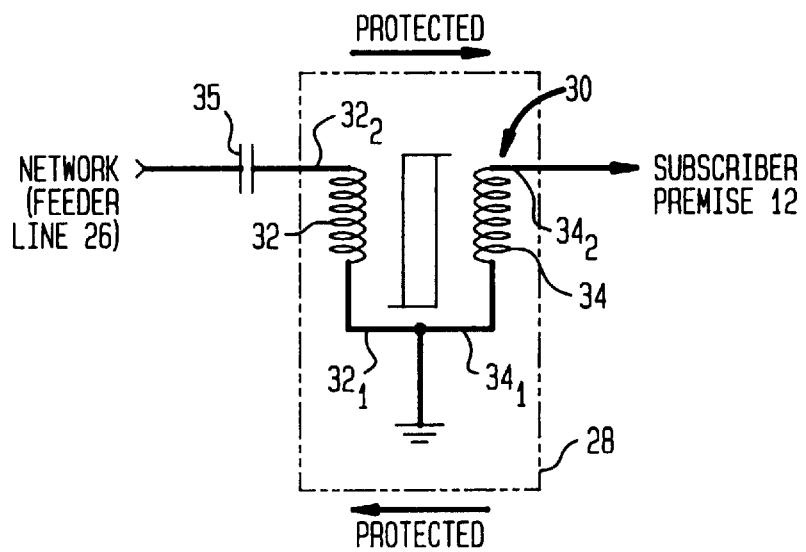
FIG. 2 shows a first embodiment of a protection mechanism, in accordance with the invention, for reducing the incidence of overload within the network of FIG. 1.

Referring to FIG. 2, there is shown a block diagram of a protection mechanism 28, in accordance with the invention, for reducing the incidence of overload (i.e., excessive noise and/or excessive signals) to the network 10 from a subscriber premises 12. In the embodiment of FIG. 2, the apparatus 28 comprises a saturable core reactor 30 having a primary winding 32 and a secondary winding 34. The primary and secondary windings 32 and 34 each have a first terminal $32_1$ and $34_1$, respectively, coupled to circuit ground. The primary winding 32 of the reactor 30 has a second terminal $32_2$ coupled to the feeder trunk 26 while the secondary winding 34 has a second terminal $34_2$ coupled to the subscriber premises 12. To provide for DC blocking, it may be desirable to interpose a capacitor 35 between the network feeder line 26 and the second terminal $32_2$ of the primary winding 32.

When the saturable core reactor 30 (together with the capacitor 35 if present) are interposed between the subscriber premises 12 and the feed line 26, the reactor will protect the network against an overload due to excessive noise and/or signals originating at the subscriber premises 12. If the noise and/or signals at the subscriber premises 12 destined for transmission to the head end 14 exceed a preselected magnitude (corresponding to the saturation threshold of the reactor 30), then the reactor saturates. Upon saturation, the reactor 30 blocks the excessive noise and/or signals from reaching the feeder line 26, thereby preventing the network 10 from becoming overloaded.

An additional benefit of the utilizing the saturable reactor 30, in the manner described, is that the reactor will also block excessive noise and/or signals emanating within the network 10 from passing to the subscriber premises 12. Should the level of signals and/or noise on the feeder line 26 exceed the threshold of the saturable core reactor 30, then the reactor saturates, thus blocking such noise and/or signals from reaching the subscriber premises 12. The reactor 30 thus provides overload protection against excessive signals passing from the network 10 (via the feeder line 26) to the subscriber premises and also provides overload protection against excessive signals generated at each subscriber premises 12.

In some instances, it may not be desirable to provide overload protection in the network 10 against excessive noise and/or signals originating in the network (as opposed to those originating from each subscriber premises 12). The signals that originate in the network 10 are generally controlled by the network provider and can be more readily limited at any single point within the network, rather than at each subscriber premises 12. Referring to FIG. 3, there is shown a protection mechanism 28' for providing such one-way protection. The protection mechanism 28' includes a first filter combination $36_1$ that includes a high pass filter comprised of a capacitor 38 coupled between a pair of filter ports $42_1$ and $44_1$, and an inductor 45 coupled between the filter port $42_1$ and circuit ground. The filter combination $36_1$ further includes a low pass filter comprised of an inductor 46 coupled between the filter port $44_1$, and a filter port $48_1$, and a capacitor 50 that shunts the filter port $48_1$ to ground. The filter port $44_1$ of the filter combination $36_1$ is connected to the feeder line 26.

A capacitor 52 couples the port $42_1$ of the filter combination $36_1$ to a filter port $42_2$ of a filter combination $36_2$ configured identically to the filter combination $36_1$. A saturable core reactor 30, configured identically to the saturable core reactor 30 of FIG. 2, has its primary and secondary winding terminals $32_2$ and $34_4$ coupled to the ports $48_1$ and $48_2$ of the filter combinations $36_1$ and $36_2$, respectively. The port $44_2$ of the filter combination $36_2$ is coupled to the subscriber premises 12.

In operation, excessive noise and/or signals at frequencies on the order of 5–40 MHz. that emanate from the subscriber premises 12 will be blocked by the reactor 30 when such noise and/or signals exceed the saturation threshold of the reactor. To the extent that such excessive noise and/or signals bypass the reactor 30, harmonics and/or intermodulation products of such excess noise and/or signals within this frequency range are effectively blocked by the low pass filter (capacitor 50 and inductor 46) within each of the filter combinations $36_1$ and $36_2$. As a consequence, the filter combinations $36_1$ and $36_2$, together with the saturable core reactor 30, provide overload protection to the network for excessive noise and/or signals emanating from the subscriber premises within the frequency range of 5–40 MHz.

Excessive noise and/or signals emanating from the network 10 within a frequency band of 50–750 MHz will typically bypass the saturable core reactor 30 of the protection mechanism 28' and will pass through the filter combinations $36_1$ and $36_2$ and the capacitor 52 to the subscriber premises 12. At this frequency range, the filter combinations $36_1$ and $36_2$ block little if any of the signals from the network 10 that enter the protective mechanism 28'.

The protection mechanism 28' offers two advantages. First, the saturation level of the protection mechanism 28' is determined almost exclusively by the upstream signal originating at the subscriber premises 12—12. Second, any harmonics and/or intermodulation products created by the non-linearity associated with the saturable core reactor 30 will be blocked from the feeder coax 26 by the filter combination $36_1$. It is possible that harmonics and/or intermodulation created by the protection mechanism 28' could form in the downstream signals and cause interference. The low pass filter formed by the combination of capacitor 50 and the inductor 46 within the filter combination $36_1$ reduces the amount of such harmonics that would affect other subscribers. The filter combination $36_2$ reduces the harmonics that would affect the subscriber 12.

In certain circumstances, the upstream signals (those originating at the subscriber premises 12—12) are transmitted in a higher frequency band than the downstream signals. A mechanism 28" for providing such protection is illustrated schematically in FIG. 4. The protection mechanism 28" includes a pair of filter combinations $36'_1$ and $36'_2$ and a saturable core reactor element 30 coupled between the filter combinations in a similar fashion as with the protection mechanism 28'. As compared to the filter combination 36$_1$ of FIG. 3, the filter combination 36'$_1$, of FIG. 4 includes a low pass filter comprised of capacitor 38, coupled between the filter port 42$_1$ and circuit ground, and an inductor 45 coupled between the filter ports 42$_1$ and 44$_1$. The filter combination 36'$_1$ also includes a high pass filter comprised of capacitor 50, coupled between the filter ports 44$_1$ and 48$_1$, and inductor 46, coupled between the filter port 48$_1$ and ground. An inductor 54 couples the ports 42$_1$ and 42$_2$ of the filter combinations 36'$_1$ and 36'$_2$ respectively.

Upstream signals received by the protection element 28" from the subscriber premises 12 enter the port 44$_2$ of the filter combination 36'$_2$. The signals pass through the high pass filter within the filter combination 36'$_2$ comprised of the capacitor 50 and inductor 46 (see FIG. 4). The signals then exit the filter combination 36$_2$ at the port 48$_2$ and pass via the saturable core reactor 30 to filter combination 36'$_1$ for passage via the high pass filter therein (capacitor 50 and inductor 46) to the feeder line 26. Excessive signals and/or noise emanating at the subscriber premises 12 are thus blocked by the saturable core reactor 30.

The downstream signal from the feeder line 26 enters the filter combination 36'$_1$ through the low pass filter comprised of the capacitor 38 and the inductor 45. The output of the filter combination 36'$_1$ at the output port 42$_1$ passes through an inductor 54 to the filter combination 36'$_2$ where the signal passes through the low pass filter therein comprised of the inductor 45 and the capacitor 38. In this way, the protection mechanism 28" of FIG. 4 blocks any harmonics and/or intermodulation products attributable to the saturable core by the filter combinations 36'$_1$ and 36'$_2$.

It is to be understood that the above-described embodiment is merely illustrative of the principles of the invention. Various modifications and changes may be made thereto by those skilled in the art which will embody the principles of the invention and fall within the spirit and scope thereof.

What is claimed is:

1. A method for reducing the incidence of overload in network attributable to excessive noise and/or signals originating at a subscriber premises coupled to the network comprising the step of transmitting signals and any noise originating at the subscriber premises and destined for the network through at least one saturable core reactor that becomes saturated when the combined level of the signals and any noise exceeds a prescribed threshold so that excess noise and signals are blocked by the reactor from reaching the network.

2. The method according to claim 1 further including the step of transmitting signals and any noise originating at the network and destined for the subscriber premises through at least one saturable core reactor.

3. The method according to claim 2 further including the step of filtering signals for passage through said reactor to isolate signals in a prescribed frequency band and to bypass signals lying outside said preselected band.

4. The method according to claim 3 wherein the signals that bypass the reactor originate with the network and are destined for the subscriber.

5. The method according to claim 2 wherein any harmonics and/or intermodulation created by the saturable core reactor upon blocking excessive noise and/or signals originating from the subscriber premises are themselves blocked from each subscriber.

6. The method according to claim 3 wherein the filtering also serves to isolate the saturable core reactor from the network.

7. The method according to claim 1 wherein the saturable core reactor saturates in the presence of excessive signal levels to protect the network against damage.

* * * * *